US012792515B2

(12) United States Patent
Nag et al.

(10) Patent No.: US 12,792,515 B2
(45) Date of Patent: Nov. 10, 2026

(54) MEMORY DEVICE TO OFFLOAD PROCESSING FROM AN ADVANCED DRIVER ASSISTANCE SYSTEM

(71) Applicant: Micron Technology, Inc., Boise, ID (US)

(72) Inventors: Abhilash Nag, Bangalore (IN); Shiva Pahwa, Bangalore (IN); Sathyashankara Bhat Muguli, Bangalore (IN); Ravi Kiran Gummaluri, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 557 days.

(21) Appl. No.: 17/861,064

(22) Filed: Jul. 8, 2022

(65) Prior Publication Data

US 2024/0012757 A1 Jan. 11, 2024

(51) Int. Cl.
*G06F 12/0817* (2016.01)
*B60T 8/174* (2006.01)

(52) U.S. Cl.
CPC .......... *G06F 12/0828* (2013.01); *B60T 8/174* (2013.01); *G06F 2212/621* (2013.01)

(58) Field of Classification Search
CPC . G06F 12/0828; G06F 2212/621; B60T 8/174
See application file for complete search history.

(56) References Cited

U.S. PATENT DOCUMENTS

| | | | | |
|---|---|---|---|---|
| 11,403,517 | B2 * | 8/2022 | Tickoo | G06N 3/063 |
| 2018/0300964 | A1 * | 10/2018 | Lakshamanan | G06F 9/5027 |
| 2019/0174514 | A1 * | 6/2019 | Ramesh | G06Q 50/40 |
| 2019/0382029 | A1 | 12/2019 | Golov | |
| 2021/0406065 | A1 * | 12/2021 | Liu | G06F 18/217 |
| 2022/0028185 | A1 * | 1/2022 | Wang | B60W 40/09 |
| 2023/0032183 | A1 * | 2/2023 | Kang | H04L 67/1001 |
| 2023/0192142 | A1 * | 6/2023 | Wang | H04B 10/1141 701/23 |

OTHER PUBLICATIONS

Debrenda Das Sharma, et al. "Compute Express Link 2.0 White Paper." Compute Express Link, Feb. 2021.

* cited by examiner

*Primary Examiner* — Ramsey Refai
(74) *Attorney, Agent, or Firm* — Greenberg Traurig

(57) ABSTRACT

Systems, methods, and apparatus related to memory devices. In one approach, a memory device stores data received from sensors of a vehicle. The memory device includes an off-loading engine used to perform computations on portions of the stored data. The offloaded computations include processing using a neural network. An output from the neural network generates an instruction for a processor of the vehicle. The processor of the vehicle reads instruction from a cache of the memory device. Based on the read instruction, the processor of the vehicle controls one or more vehicle functions such as braking, etc.

23 Claims, 4 Drawing Sheets

302

| Speed Range (mph) | Speed of the Car (Real Time) | Time Taken for Car to Slow Down (Historical Data/ML) | Tire Pressure and Tire State (Real Time) | Surroundings and Other Factors (Real Time) | Ideal Braking Time (AI/ML) | Historical Decision (Slow/Stop/Skid/ Training) |
|---|---|---|---|---|---|---|
| 30-40 | | | | | | |
| 41-50 | | | | | | |
| 51-60 | | | | | | |
| 61-70 | | | | | | |
| 71-80 | | | | | | |

304

306

FIG. 3

MEMORY DEVICE TO OFFLOAD PROCESSING FROM AN ADVANCED DRIVER ASSISTANCE SYSTEM

FIELD OF THE TECHNOLOGY

At least some embodiments disclosed herein relate to memory devices in general, and more particularly, but not limited to memory devices used to offload computations from a processor of a vehicle.

BACKGROUND

A user of a vehicle can be a driver in the case of a manually-driven vehicle. In other cases, such as for an autonomous vehicle, the user of the vehicle typically performs fewer control actions than a conventional driver as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway. One function of these sensors is to detect objects that are encountered during travel of the vehicle.

Autonomous vehicles use a variety of sensors and artificial intelligence algorithms to detect these objects and to analyze the changing environment around the vehicle during travel. Objects that are encountered may include, for example, traffic lights, road signs, road lanes, etc. Failing to detect certain of these objects could cause an unexpected or undesired behavior of the vehicle, and in some cases could expose passengers of the vehicle and/or others outside of the vehicle (e.g., in the immediate area surrounding the vehicle) to danger.

In some cases, an object may be positioned in a way that creates an unsafe driving condition (e.g., a deep pothole in the center of a road). Failure by a driver or an autonomous vehicle navigation system to detect the unsafe condition may create a physical danger of injury to the driver and/or other passengers of a vehicle (e.g., a vehicle that suddenly encounters a deep pothole or other unsafe road condition without warning).

During normal operation of a vehicle, the various sensors are used to operate the vehicle. For example, a computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves an artificial neural network (ANN) for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where k=1, 2, . . . , n. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where k=1, 2, . . . , n. The activation function may be in the form of a step function, a linear function, a log-sigmoid function, etc. Different neurons in the network may have different activation functions.

Each neuron m generates a weighted sum $s_m$ of its inputs and its bias, where $s_m=b_m+w_{m1}\times p_1+w_{m2}\times p_2+ \ldots +w_{mn}\times p_n$. The output $a_m$ of the neuron m is the activation function of the weighted sum, where $a_m=f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model, a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters. Multiple training algorithms are typically employed for a sophisticated machine learning/training paradigm.

Various types of non-volatile storage devices can be used to store data associated with operation of a vehicle. Non-volatile storage devices can include NAND flash memory devices. NAND flash is a type of flash memory constructed using NAND logic gates. Alternatively, NOR flash is a type of flash memory constructed using NOR logic gates. Currently, the use of NAND flash predominates the flash market.

Typical computer storage devices have controllers that receive data access requests from host computers (e.g., a host device of a vehicle) and perform programmed computing tasks to implement the requests in ways that may be specific to the media and structure configured in the storage devices. In one example, a flash memory controller manages data stored in flash memory and communicates with a computer device. In some cases, flash memory controllers are used in solid state drives.

Firmware can be used to operate a flash memory controller for a particular storage device. In one example, when a computer system or device reads data from or writes data to a flash memory device, it communicates with the flash memory controller.

BRIEF DESCRIPTION OF THE DRAWINGS

The embodiments are illustrated by way of example and not limitation in the figures of the accompanying drawings in which like references indicate similar elements.

FIG. 3 shows a data structure for storing historical data associated with the operation of a vehicle, in accordance with some embodiments.

DETAILED DESCRIPTION

Figure 1:
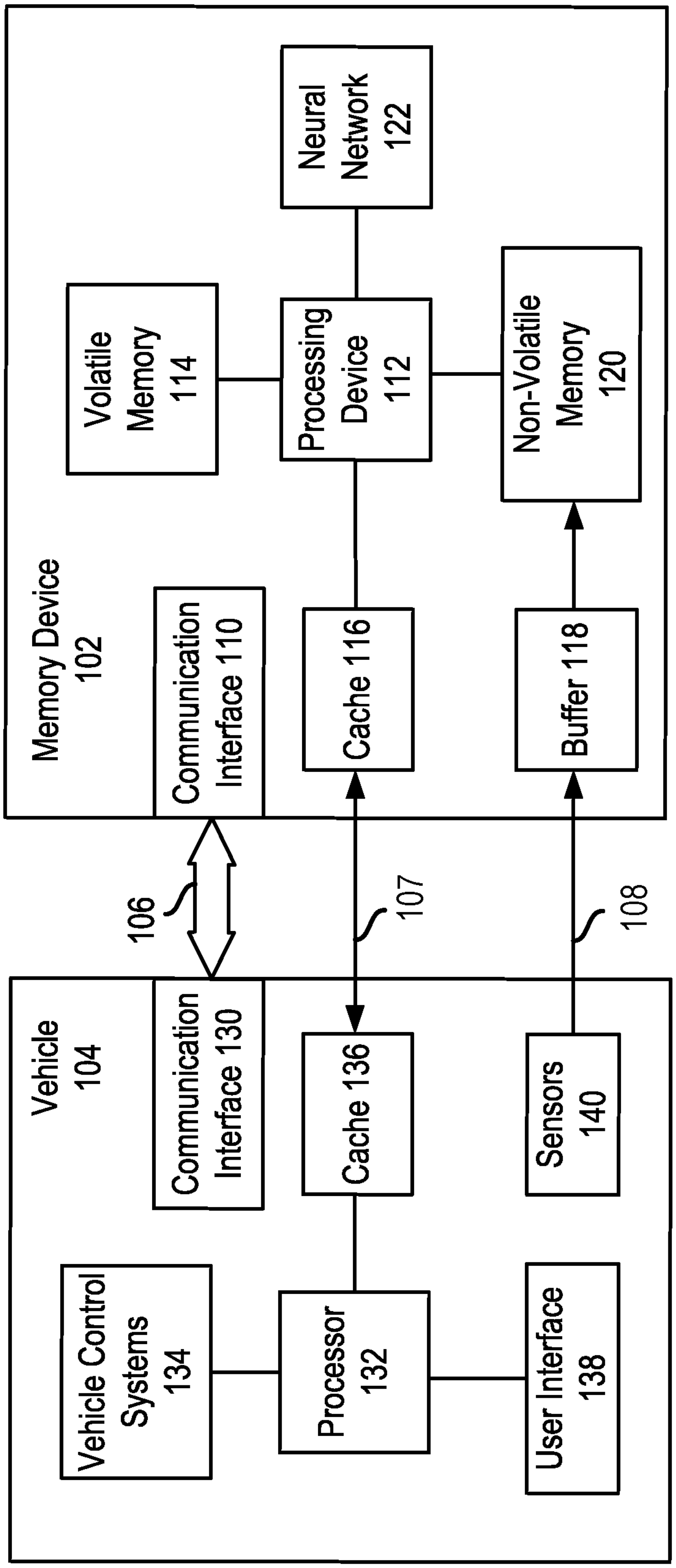
FIG. 1 shows a memory device that offloads computations from a processor of a vehicle, in accordance with some embodiments.

The following disclosure describes various embodiments for memory devices used to offload computations from a processor of a vehicle or other computer system. For example, the vehicle may be a car, truck, plane, or boat. Other computer systems may include manufacturing equipment, transportation equipment, and/or robotic devices.

At least some embodiments herein relate to storage of data (e.g., sensor data) associated with a vehicle. The data may be stored, for example, in a flash memory device that includes memory resources and/or processing resources available for use by a processor of a host device of the vehicle. The memory device may, for example, store data used by the host device (e.g., a computing device of an autonomous vehicle, or another computing device that accesses data stored in the memory device). In one example, the memory device is a semiconductor device including one or more processing devices and one or more memories for storing data generated during operation of a vehicle.

Modern vehicles (e.g., cars) are sophisticated mechanical and computing machines. Typical cars of today have numerous different features to improve the driving or riding experience of a driver or passenger. Among all of these features, the most critical features relate to user safety. A processor of a vehicle ensures safe operation of the vehicle by storing and performing analyses on huge quantities of data being collected by the vehicle from sensors and other components of the vehicle. All of this data is captured to predict and avoid unsafe conditions (e.g., any uncertainties).

Due to the large quantities of data flowing to the processor from sensors and other input devices of the vehicle, there is a need for significant processing bandwidth (e.g., processing done to keep the user safer and/or improve the user's experience). The processor must always be available to take immediate action in case of a safety issue (e.g., a failure of a vehicle component such as a brake).

In some cases, some of the processor's cores are kept idle for processing critical failures. But keeping many cores idle can be an inefficient use of compute resources of the vehicle.

Modern cars are like miniature data centers, and there is a lot of data being generated from many I/O peripheral devices of the vehicle. These devices are continuously streaming data to the processor of the vehicle. This streaming data is in small data units or chunks (e.g., 1-25 bits per chunk, or 5-10 bytes per chunk). For example, sensors of the vehicle transmit many small and continuous chunks of raw data. This raw data is processed by the processor (e.g., central processing unit (CPU) of the vehicle).

Typically, there is a mix of data from different related sources on the vehicle. The data needs to be interpreted in parallel to best understand the risks involved. The data from many of these sources is of high importance and needs to be monitored/analyzed in parallel by the processor. This monitoring and analysis need adds a lot of complexity to the CPU operation, which can create technical problems (e.g., overloading of the processor).

For example, as the CPU gets increasingly busy with newer I/O streams, the processor needs to keep increasing the number of cores allotted for high priority I/O peripherals. As there is a limit on the number of cores, attempts are made to timeshare some of the cores. However, this timesharing can cause delay that could lead to a catastrophic accident or event.

In addition, many sensors used in vehicles only generate data in small chunks (e.g., merely bits) of data. In this situation, saving the generated data on a block storage device becomes cumbersome. For example, there is a continuous stream of bits that continuously gets streamed from the sensors, and this data needs to be persistently saved for analytics. However, this requires much buffering and flushing of the data on to block storage devices. Also, block storage devices are not as fast as a cache device for data processing and analytics.

To address these and other technical problems, a memory device includes a processing device (e.g., a processor executing an offloading engine) to reduce the processing burden on a processor (e.g., CPU) of a vehicle. The use of the offloading engine reduces the load on the CPU by processing the large quantities of raw data generated by peripheral devices of the vehicle. The offloading engine only shares critical decision-making information to the CPU of the vehicle. The generated raw data is stored by the memory device, and provided as needed to the offloading engine for analysis (e.g., using a neural network). Results (e.g., a braking instruction) from the analysis are provided to the CPU of the vehicle.

As the number of peripheral devices of a vehicle increases, there is a lot of correlation between many sets of stream data from peripheral devices. It is desirable to process these multiple streams in parallel. This can require one or more CPUs with significant compute capacity. As the number of streams increases, more than one CPU is used to handle all the streams in parallel.

In one embodiment, a memory device offloads computations from one or more CPUs of a vehicle. In one example, the memory device is a Compute Express Link (CXL) device that communicates with the CPU(s) in accordance with the Compute Express Link (CXL) standard (e.g., CXL 2.0), which allows interconnect to provide high-bandwidth, low-latency connectivity between a host processor (e.g., CPU of a vehicle) and devices (e.g., memory device having an offloading engine). The CXL device includes a processing device and memory (e.g., a cache to receive sensor data and a non-volatile memory to store the sensor data along with other data as historical data). In one example, use of the CXL device enables coherency and memory semantics on top of PCI Express® (PCIe®) 5.0 based I/O semantics.

For example, operation according to the CXL standard supports dynamic multiplexing between a set of protocols that includes I/O (CXL.io, based on PCIe), caching (CXL-.cache), and memory (CXL.memory) semantics. This CXL operation maintains a unified, coherent memory space between the CPU (host processor) and any memory on an attached CXL device. This allows both the CPU and device to share resources and operate on the same memory region for higher performance, reduced data-movement, and reduced software stack complexity.

In one embodiment, the CXL device is connected to the car's CXL port. The CXL device is configured as a cache, memory, and I/O device. A CXL.io device will be used to store all the required stream input data (e.g., GPS, videos, sensors) for further processing. A CXL.mem device is used to load all the input data and perform computations and analytics for providing results from the computations as inputs to the car's processor (e.g., a CPU in an advanced driver assistance system (ADAS)). A CXL.cache is coherent to the CXL device's processor and the CPU of the car.

In one embodiment, a memory device (e.g., CXL device) includes memory configured to store data received from a vehicle. The memory may include volatile and non-volatile memory. The CXL device has one or more processing devices configured to perform computations (e.g., computations offloaded from an ADAS) using a portion of the stored data to provide at least one instruction for the vehicle. The portion of data used may be selected based on the function of the vehicle to be controlled. The processing device(s) is further configured to provide the instruction for reading by a processor (e.g., CPU of the ADAS) of the vehicle. The processor of the vehicle controls at least one function of the vehicle based on the instruction. In one embodiment, coherency of the stored data is maintained between the processor and the at least one memory. In one example, the coherency is cache coherency between a CXL-.cache of the CXL device and a cache and/or other memory used by the processor of the vehicle. In one example, the processing device of the CXL device has multiple cores.

In one embodiment, a system for offloading data analysis from an ADAS includes a cache configured to store at least one instruction accessible by the ADAS. The system further includes at least one memory and at least one processor. The memory is configured to store historical data associated with operation of the vehicle (e.g., data associated with braking or steering of the vehicle). The processor is configured to perform computations on the historical data to generate the instruction, and then write the instruction to the cache for reading by the ADAS. The ADAS controls the vehicle based on the instruction that is read from the cache. In one example, the cache is operated according to a CXL.cache protocol.

FIG. 1 shows a memory device 102 that offloads computations from a processor 132 of a vehicle 104, in accordance with some embodiments. In one example, the computations offloaded from processor 132 are performed to analyze data collected from sensors 140. In one example, the collected data is analyzed by neural network 122.

Neural network 122 generates output used to control one or more functions of vehicle 104. Processing device 112 generates instructions based on the output from neural network 122 and writes these instructions on cache 116. Processor 132 reads these instructions and controls various vehicle control systems 134 based on these instructions. In one example, the instruction is to activate a brake of vehicle 104.

In one embodiment, cache coherency 107 is maintained between cache 116 and cache 136. In one example, the cache coherency is maintained by processor 132 in accordance with the CXL standard. In one example, processor 132 reads the instructions generated by processing device 112 by reading the instructions from cache 136.

During operation of vehicle 104, various types of data are generated by sensors 140. Sensors 140 include, for example, brake sensors, tire sensors, cameras, LIDAR sensors, and GPS sensors. This data is provided to and stored by buffer 118. In one example, the data is provided as stream data 108 from one or more of sensors 140. In one example, buffer 118 is DRAM.

In one embodiment, buffer 118 receives other data from vehicle 104 in addition or alternatively to sensor data from sensors 140. This other data may include results from processing performed by processor 132. In one example, these results from processor 132 include data regarding activation of various control systems 134. In one example, the results include a braking pattern of vehicle 104 implemented by processor 132. The other data received by buffer 118 may additionally or alternatively include data associated with a context of operation of vehicle 104.

As buffer 118 receives data from vehicle 104, buffer 118 becomes increasingly full. When a quantity of data stored in buffer 118 reaches a threshold (e.g., buffer 118 is full), stored data in buffer 118 is flushed to non-volatile memory 120. In one example, non-volatile memory 120 is NAND flash memory. In one example, non-volatile memory 120 stores various data from buffer 118 as historical data for use by processing device 112 in data analysis.

In one embodiment, processing device 112 uses historical data stored in non-volatile memory 120 to train neural network 122. After neural network 122 is trained, data subsequently received from vehicle 104 is used as input to neural network 122 for generating instructions to control vehicle 104. In one example, this subsequent data includes data associated with operation of a braking control system 134 of vehicle 104.

Volatile memory 114 is used by processing device 112 during computations. In one example, volatile memory 114 is DRAM that stores intermediate results from processing performed by neural network 122. In one example, volatile memory 114 is used to provide buffer 118 and/or cache 116.

In one example, memory device 102 is a CXL device. Volatile memory 114 and/or non-volatile memory 120 are operated in accordance with the CXL.mem protocol. In one example, data stored in non-volatile memory 120, volatile memory 114, and/or cache 116 is byte-addressable by processor 132 and/or processing device 112.

In one embodiment, memory device 102 communicates with vehicle 104 using communication interface 110. Communication interface 130 of vehicle 104 communicates with communication interface 110 over interconnect 106. In one example, this communication is performed in accordance with the CXL standard. In one example, communication interface 110 communicates with communication interface 130 in accordance with a CXL.io protocol. In one example, interconnect 106 is a memory bus. In one example, the memory bus is operated according to a DDR memory protocol. In one example, memory device 102 operates as storage class memory for vehicle 104 (e.g., vehicle 104 accesses data from memory device 102 using logical block addressing). In one example, interconnect 106 is implemented using a Bluetooth interface, a local area network (LAN), a mobile wireless network such as 4G or 5G, and/or any combination thereof.

Vehicle 104 includes user interface 138. Processor 132 generates various alerts based on instructions received from memory device 102. In one example, these alerts can be presented to a user of vehicle 104 on user interface 138. In one example, user interface 138 is a display and/or speaker. In one example, user interface 138 presents a message to the user indicating a suggested action and/or describing an action being performed on vehicle 104.

In one embodiment, processor 132 sends requests for resources to processing device 112 over interconnect 106. Processing device 112, in response to receiving a request for resources, allocates memory resources and/or compute resources to processor 132. In one example, the memory resources include non-volatile memory 120 and/or volatile memory 114. In one example, the computer resources include computation support by processing device 112 (e.g., using neural network 122).

In one embodiment, stream data 108 is monitored by processing device 112. The stream data 108 is stored in non-volatile memory 120. In one example, this monitoring includes providing the stream data 108 as inputs to neural network 122. Outputs from neural network 122 include instructions for control of vehicle control systems 134.

In one embodiment, one or more cores of processing device 112 are reserved for continuously monitoring stream data 108, and saving stream data 108 in non-volatile memory 120. In one example, many different streams of data need to be analyzed and interpreted.

For example, the streams can be one or more of: driver behavior (braking patterns, history), video image recognition (sign boards, signals, tailing car, visibility, etc.), temperature sensor data for weather conditions, GPS sensors for location or terrain information, vehicle data (brake, tire wear, etc.), animal crossing signs, pedestrian crossing signs (e.g., sign boards), brake pad wear and tear, or car speed. The streams of data are analyzed so that results are provided to processor 132 (e.g., provide analytical data to an ADAS to start braking before a user starts to do so). Thus, memory device 102 deterministically assists in stopping the car before emergency brakes would have otherwise been applied from the ADAS (thus avoiding an emergency braking situation). In one embodiment, each of these operations will be parallelly offloaded to one of the cores of processing device 112.

In one embodiment, analytics are performed and processed on CXL.mem memory and are persisted in a timely manner. This ensures the data is flushed once the buffers 118 are full, and hence avoids unnecessary wear on the non-volatile memory 120 (e.g., NAND devices) due to smaller writes of stream data 108.

After processing data from vehicle 104, when the processing device 112 finds an alert that needs to be passed down to the ADAS processor 132 (e.g., CPU), data is written on cache 116 (e.g., CLX cache) to be coherent with the ADAS processor 132 (e.g., via cache 136). Based on the status received by reading cache 136, processor 132 warns the driver, slows down vehicle 104, limits the speed of vehicle 104, and/or uses emergency braking of vehicle 104.

In one embodiment, memory device 102 is a CXL device. Cache 116 is coherent and can snoop or read data of processor 132.

In one embodiment, braking event data received by memory device 102 from vehicle 104 is analyzed (e.g., by neural network 122) to determine that the braking events correspond to a pattern. For example, pattern recognition can be used on the received data. In one case, machine learning is used to recognize patterns or regularities in data. In some cases, a pattern recognition system can be trained from labeled training data (e.g., supervised learning). In other cases, when no labeled data is available, other algorithms can be used to identify previously unknown patterns (e.g., unsupervised learning).

In one embodiment, a braking event is identified based on a measurement of a brake pedal in vehicle 104. For example, a braking event may be identified based on a foot pressure or extent of movement as compared to a predetermined threshold. In another embodiment, a braking event is identified based on a rate of deceleration of the vehicle. For example, if a rate of deceleration exceeds a predetermined threshold, then a braking event is identified. In another example, the rate of deceleration is observed over a predetermined time period (e.g., the rate is averaged over the time period).

In one embodiment, identifying an unsafe location at which vehicle 104 brakes suddenly requires that a number of braking events within a time period exceed a predetermined number or threshold. For example, the identification can require that three or more braking events occur in a given day or month.

In one embodiment, in response to identifying an unsafe location, at least one action is performed. For example, a communication can be sent to vehicle 104 by memory device 102 that identifies the location.

In various other embodiments, the configuration of one or more actions performed by vehicle 104 in response to instructions from memory device 102 may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle.

In some embodiments, the analysis of braking event and/or sensor data collected by memory device 102 includes providing the data as an input to a machine learning model. The vehicle 104 is controlled by performing one or more actions that are based on an output from the machine learning model.

In one example, a machine learning model is trained and/or otherwise used to configure a vehicle (e.g., tailor actions of the vehicle). For example, the machine learning model may be based on pattern matching in which prior patterns of sensor inputs or other data is correlated with desired characteristics or configuration(s) for operation of the vehicle.

In one embodiment, data received from the vehicle 104 may include sensor data collected by the vehicle during its real world services (e.g., when the user is a driver or a passenger). In one embodiment, the data is wirelessly transmitted from the vehicle to a memory device 102 (e.g., at a centralized server of a cloud service), which performs machine learning/training, using a supervised method and the received sensor data and/or other data, to generate an updated ANN model that can be subsequently loaded into the vehicle to replace its previously-installed ANN model. The model is used to configure the operation of the vehicle.

In some embodiments, the driver can take over certain operations from the vehicle in response to the vehicle receiving a communication that an unsafe situation has been identified. One or more cameras of the vehicle, for example, can be used to collect image data that assists in implementing this action. In one example, the vehicle is configured in real-time to respond to the received braking event and/or object data.

In one embodiment, data regarding braking events occurring on vehicle 104 is received by memory device 102 of a server via a communication network. The received data includes a location for each of several braking events. For example, the received data can include an event location for each braking event. A braking event can include data such as, for example, an identifier, a type of braking event, etc. The received braking event data can be stored as part of map data for use in generating control instructions for the vehicle 104.

In some embodiments, additional data is received from the vehicle 104. This can include, for example, data regarding detected objects such as object type and object location. This additional data can be stored as part of map data.

The braking or other event data received from the vehicle is analyzed. For example, this analysis can include pattern recognition or other data analysis (e.g., determining a correlation of braking event data to other data) to determine that the braking events correspond to a pattern. For example, event location data can be analyzed to detect a pattern. In one embodiment, this pattern detection can be based at least in part on an output from artificial neural network model. In one example, based on analysis of the received braking event data, a location is identified (e.g., an unsafe road obstacle). For example, memory device 102 may determine that a set of braking events corresponds to a pattern and a corresponding location is identified based on this determination. In one example, a location can be determined as being unsafe based on numerous emergency braking activations on vehicle 104 at that location or within a predetermined distance of the identified location.

In response to identifying the location, at least one action is performed. For example, memory device 102 can provide an instruction to vehicle 104 that causes the vehicle to change a navigation path and/or activate a braking system.

In some embodiments, in addition to sending data regarding braking events, vehicle 104 provides data to memory device 102 regarding objects detected during travel. Sensors of vehicle 104 generates data regarding objects that have been detected. Data regarding detected objects can be analyzed by memory device 102 in conjunction with braking event data (e.g., in order to identify a location that prompts an action, or to generate other control instructions).

Figure 2:
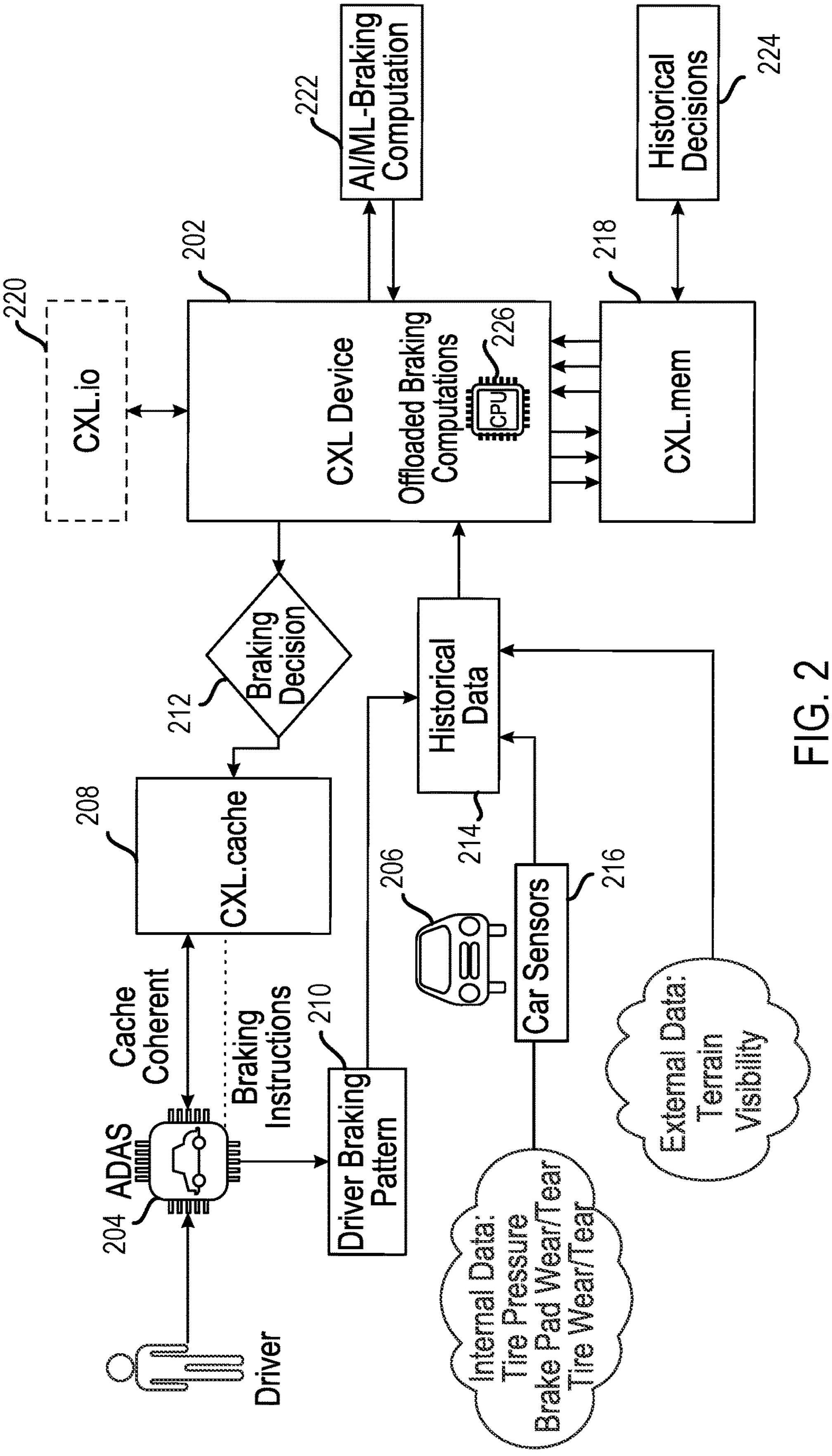
FIG. 2 shows a memory device that writes instructions generated from offloaded computations to a cache used by a processor of an advanced driver assistance system (ADAS), in accordance with some embodiments.

FIG. 2 shows a memory device 202 (e.g., CXL device) that writes instructions generated from offloaded computations to a cache 208 used by a processor 204 of an advanced driver assistance system (ADAS) of vehicle 206, in accordance with some embodiments. Vehicle 206 is an example of vehicle 104. Processor 204 is an example of processor 132. Memory device 202 is an example of memory device 102. Cache 208 is an example of cache 116.

During operation of vehicle 206 (e.g., a car or truck), sensors 216 of vehicle 206 send data to memory device 202 over a communication interface (e.g., using interconnect 106). This data is collected as historical data 214. In one example, the data is collected by buffer 118 and persistently stored in non-volatile memory 120.

In one example, the data sent by sensors 216 includes internal data associated with internal operation of vehicle 206 and external data associated with external operation of vehicle 206. In one example, the internal data includes tire pressure, brake pad wear and tear, and/or tire wear and tear. In one example, the external data includes data associated with terrain around the vehicle 206 and/or visibility of vehicle 206. In one example, the external data is collected by cameras and/or LIDAR sensors of vehicle 206.

In addition to data from sensors 216, historical data 214 can include other data associated with operation of vehicle 206. In one example, driver braking pattern 210 is sent by processor 204 to memory device 202 for storage as historical data 214. In one example, driver braking pattern 210 indicates how a driver applied a brake of vehicle 206. In one example, driver braking pattern 210 is associated with sensor data collected by sensors 216. In one example, this associated sensor data is collected for a predetermined duration of time prior to a braking event and/or subsequent to the braking event.

In one embodiment, memory device 202 performs artificial intelligence/machine learning computations 222 using data received from vehicle 206 as inputs. In one example, these computations are performed by processing device 226 using a neural network (e.g., neural network 122). During these computations, process invites 226 uses memory 218 (e.g., memory configured according to a CXL.mem protocol).

Memory 218 can be volatile and/or non-volatile memory. Historical decisions 224 includes results from prior computations and/or instructions sent to vehicle 206 from memory device 202. In one example, a portion of historical decisions 224 are copied from non-volatile memory to volatile memory 218 to accelerate computations by processing device 226. In one example, braking decision 212 is an output of artificial intelligence computations 222.

Processing device 226 writes data to cache 208 corresponding to braking decision 212 and/or other instructions generated by computations of processing device 226. In one embodiment, data written to cache 208 is copied to a cache or other memory of processor 204 (e.g., in accordance with the CXL standard) for reading by processor 204. In response to reading this cache or other memory, processor 204 causes a control system of vehicle 206 to perform one or more functions (e.g., activating a braking system).

In one embodiment, a management interface 220 can be used to configure memory device 202. In one example, management interface 220 operates in accordance with a CXL.io protocol. In one example, processor 204 uses management interface 220 to configure memory device 202 (e.g., to configure a resource allocation).

In one embodiment, historical data 214 received from vehicle 206 will be analyzed on the CXL.mem device and whenever necessary, processing device 226 will write data on the CLX cache 208 that will be coherent with the ADAS processor (e.g., car CPU 204) so that the ADAS can process braking and other decisions more quickly and more efficiently, and the processing can be based on multiple factors.

In one embodiment, CPU 204 offloads data analytics to CXL device 202 to predict emergency braking based on user braking history.

In one example, CXL.mem is volatile memory on the same chip as the CXL device 202.

In one example, processor 204 of the car uses the braking decision 212 to start braking earlier than would be the case without use of memory device 202. In one example, this is 20 to 30 milliseconds (ms) earlier.

In one example, CXL.cache 208 is used to sync between an ADAS cache and CXL.cache 208. CXL.cache is a cache coherent protocol. CXL interconnect connects memory device 202 to an ADAS system bus and ensures that the ADAS gets real-time data. In one example, a CXL device 202 responds to memory requests from the ADAS CPU.

In one example, initially, there is no data set for predicting how to handle braking. Driver braking patterns are fed by the ADAS to the historical data storage (e.g., historical data 214). The CXL device 202 trains a neural network using the historical data.

In one example, CXL device 202 is used to predict a need of a vehicle owner to do a service repair on vehicle 206.

In one example, CXL device 202 helps the ADAS avoid missing some processing/events when ADAS is busy with many other tasks. Cache coherency ensures fast ADAS access to data of CXL device 202. In one example, CXL device 202 has a protocol to enable the cache coherency (e.g., data in an ADAS cache is maintained as same as data in a CXL cache).

In one example, full video processing of data from cameras of vehicle 206 is done on the CXL device 202.

FIG. 3 shows a data structure 302 for storing historical data associated with the operation of a vehicle, in accordance with some embodiments. In one example, data structure 302 is used to store historical data 214. In one example, data structure 302 is used to store data from sensors 140. In one example, data structure 302 is implemented in a database that stores various data records 304, 306.

In one embodiment, data records 304, 306 each correspond to a speed range of the vehicle. Each record stores various data received by a memory device from the vehicle. This data can include, for example, speed of the car, time taken for the car to slow down, a tire pressure, a state of the tire, surroundings and other factors associated with the context of vehicle, a desired braking time, and/or a historical decision made regarding the vehicle. In one example, the historical decision can include whether the car slowed, stopped, or skidded. In one example, the historical decision can relate to training of a neural network of the memory device.

In one embodiment, when a new vehicle is put out on the roads, a data-driven methodology is used to monitor and track the driver's braking or other operational patterns by storing data associated with the patterns as historical data. In one example, the patterns are stored and analyzed, and a historical data of the braking or other pattern is generated.

In one embodiment, the historical data is updated each time there is an event detected by the processor of a vehicle (e.g., there has been a last-minute braking by the driver, or ADAS has been activated for emergency braking).

In one embodiment, the data associated with the driver is coupled with data associated with other aspects of the vehicle: tire data, speed, weather, and surroundings. In one example, the historical data is used by a CXL device to predict a time needed for the car to stop. This provides the ADAS with an extra layer of analytical data to start slowing down the car when needed.

In one embodiment, each time hard braking has been applied, vehicle data is saved in a defined way with respect to a speed window as illustrated in FIG. 3. In one example, the data at the time of the stopping/braking for each speed window can include: speed of the car at the time of hard-braking, time taken for the car to stop, tire pressure, and/or tire state (e.g., wear and tear).

FIG. 3 illustrates, for example, different speed ranges that data points are captured against. There are many forms of real-time data such as speed, weather, wear-out on tires, and braking. A neural network can be trained using some or all of this data (e.g., learning with user age, ethnicity, behavior, and past braking information). Using this data, a decision can be generated and sent back to an ADAS. After the ADAS takes an action based on the decision, further rectification can determine if the decision was optimal, and refine future decisions based on further iterations.

In one example, decision data and/or vehicle data can be communicated using a 5G edge communication network. In one example, cars can have collective data analytics based on this communication, and thus have improved decision making.

Figure 4:
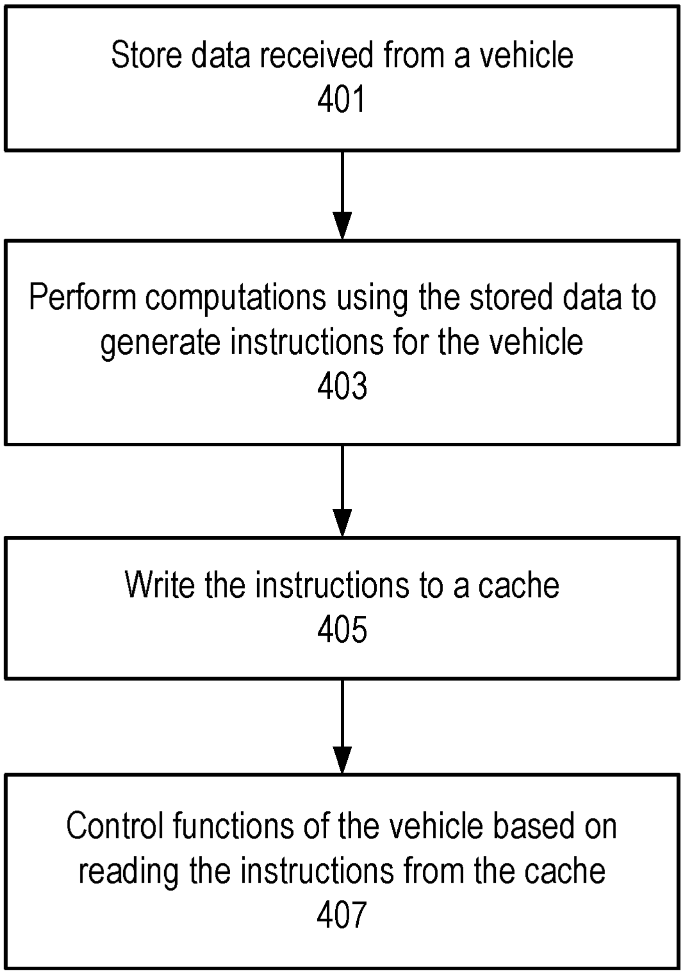
FIG. 4 shows a method for generating instructions for controlling a vehicle, where the instructions are based on computations offloaded from a processor of the vehicle, in accordance with some embodiments.

FIG. 4 shows a method for generating instructions for controlling a vehicle, where the instructions are based on computations offloaded from a processor of the vehicle, in accordance with some embodiments. For example, the method of FIG. 4 can be implemented in the system of FIG. 1. In one example, the vehicle is vehicle 104 or vehicle 206.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 112 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, data received from a vehicle is stored. In one example, the data is received from sensors 140 and/or processor 132.

At block 403, computations using the stored data are performed. The computations generate instructions for the vehicle. In one example, the computations are performed using neural network 122. In one example, an output from neural network 122 is used to generate an instruction for vehicle 104.

At block 405, the instructions are written to a cache. In one example, braking decision 212 is written to cache 208. In one example, instruction is written to cache 116.

At block 407, functions of the vehicle are controlled based on reading the instructions from the cache. In one example, vehicle control systems 134 are controlled by processor 132 based on instructions read by processor 132 from cache 136, which is coherent with cache 116 according to the CXL standard.

In one embodiment, an apparatus (e.g., memory device 102) comprises: at least one memory (e.g., buffer 118, non-volatile memory 120) configured to store data received from a vehicle; and at least one processing device (e.g., processing device 112) configured to: perform computations using at least a portion of the stored data to provide at least one instruction for the vehicle; and provide the instruction for reading by a processor (e.g., CPU of an ADAS) of the vehicle, wherein the processor is configured to control at least one function of the vehicle based on the instruction; wherein coherency of the stored data is maintained between the processor and the at least one memory.

In one embodiment, the function is braking of the vehicle.

In one embodiment, the apparatus further comprises a cache (e.g., cache 116, a CXL cache) configured to store the instruction for reading by the processor of the vehicle.

In one embodiment, the cache is a first cache (e.g., cache 116), the first cache is coherent with a second cache (e.g., cache 136) of the processor of the vehicle, and the instruction is read from the second cache to control the function of the vehicle.

In one embodiment, a coherent memory space is maintained between the processor of the vehicle and the memory (e.g., using cache coherency according to the CXL standard).

In one embodiment, the processing device is further configured to write the instruction on the cache for reading by the processor of the vehicle. In one embodiment, performing the computations comprises generating the instruction as an output from a neural network having the portion of the stored data as an input. In one example, instructions are generated as output from neural network 122. The instructions are read by processor 132 to control vehicle 104.

In one embodiment, the memory stores historical data (e.g., 214) associated with prior operation of the vehicle, and the processing device is further configured to train the neural network using the historical data.

In one embodiment, the historical data includes data received from at least one sensor (e.g., car sensors 216) of the vehicle.

In one embodiment, the apparatus further comprises volatile memory (e.g., CXL.mem) to store data used by the neural network when performing the computations.

In one embodiment, the stored data includes sensor data received from at least one sensor of the vehicle, and the stored data is byte-addressable by at least one of the processor of the vehicle or the processing device.

In one embodiment, the at least one sensor comprises at least one of a camera, a LIDAR sensor, a GPS sensor, a brake sensor, or a tire sensor.

In one embodiment, the processing device is further configured to: receive a request for resources from the processor of the vehicle; and in response to receiving the request for resources, allocate at least one of memory resources or compute resources to the processor.

In one embodiment, the processing device is further configured to: monitor stream data (e.g., stream data 108 from sensors 140) from the vehicle; and store the stream data in the memory.

In one embodiment, the memory comprises volatile memory and non-volatile memory.

In one embodiment, the volatile memory is configured to receive the data from the vehicle, and to flush the received data to the non-volatile memory when a quantity of the received data stored in the volatile memory reaches a threshold.

In one embodiment, a system (e.g., CXL device 202) comprises: a cache (e.g., CXL.cache 208) configured to store at least one instruction accessible by an advanced driver assistance system (ADAS) of a vehicle (e.g., 206); at least one memory configured to store historical data associated with operation of the vehicle; and at least one processor configured to: perform computations on the historical data to generate the instruction; and write the instruction to the cache for reading by the ADAS, wherein the ADAS is configured to control the vehicle based on the instruction.

In one embodiment, the historical data includes data regarding at least one of a speed, a tire pressure, a braking time, an environmental context, or one or more control decisions made by the ADAS or a driver of the vehicle.

In one embodiment, the historical data further includes sensor data received from sensors of the vehicle; the at least one memory comprises a buffer and non-volatile memory; the sensor data is received from the vehicle by the buffer; and the received sensor data is flushed from the buffer to the non-volatile memory when the buffer is full, or a capacity of the buffer reaches a threshold.

In one embodiment, the instruction causes the ADAS to activate at least one brake of the vehicle.

In one embodiment, the historical data includes data associated with braking of the vehicle.

In one embodiment, the system further comprises a display, wherein the instruction causes presentation of an alert to a driver of the vehicle.

In one embodiment, a method comprises: storing data received from a vehicle; performing computations using at least a portion of the stored data to generate at least one instruction for the vehicle; and writing the instruction to a cache, wherein a processing device of the vehicle is configured to control at least one function of the vehicle based on reading the instruction from the cache.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory device comprising:
at least one memory;
at least one processing device configured to:
perform computations using at least a portion of stored data to provide at least one instruction configured to control at least one aspect of a vehicle; and
provide the instruction for reading by a processor of the vehicle;
wherein coherency of the stored data is maintained between the processor and the at least one memory; and
a first cache configured to store the instruction for reading by the processor of the vehicle, wherein the first cache is coherent with a second cache of the processor of the vehicle, and wherein the instruction is read from the second cache to control a function of the vehicle.

2. The memory device of claim 1, wherein the processor is configured to control braking of the vehicle.

3. The memory device of claim 1, further comprising a cache configured to store the instruction for reading by the processor of the vehicle.

4. The memory device of claim 3, wherein the cache is a first cache, the first cache is coherent with a second cache of the processor of the vehicle, and the instruction is read from the second cache to control a function of the vehicle.

5. The memory device of claim 1, wherein a coherent memory space is maintained between the processor of the vehicle and the memory.

6. The memory device of claim 3, wherein the processing device is further configured to write the instruction on the cache for reading by the processor of the vehicle.

7. The memory device of claim 1, wherein performing the computations comprises generating the instruction as an output from a neural network having the portion of the stored data as an input.

8. The memory device of claim 7, wherein the memory stores historical data associated with prior operation of the vehicle, and the processing device is further configured to train the neural network using the historical data.

9. The memory device of claim 8, wherein the historical data includes data received from at least one sensor of the vehicle.

10. The memory device of claim 7, further comprising volatile memory to store data used by the neural network when performing the computations.

11. The memory device of claim 1, wherein the stored data includes sensor data received from at least one sensor of the vehicle, and the stored data is byte-addressable by at least one of the processor of the vehicle or the processing device.

12. The memory device of claim 11, wherein the at least one sensor comprises at least one of a camera, a LIDAR sensor, a GPS sensor, a brake sensor, or a tire sensor.

13. The memory device of claim 1, wherein the processing device is further configured to:
receive a request for resources from the processor of the vehicle; and
in response to receiving the request for resources, allocate at least one of memory resources or compute resources to the processor.

14. The memory device of claim 1, wherein the processing device is further configured to:
monitor stream data from the vehicle; and
store the stream data in the memory.

15. The memory device of claim 1, wherein the memory comprises volatile memory and non-volatile memory.

16. The memory device of claim 15, wherein the volatile memory is configured to receive the data from the vehicle, and to flush the received data to the non- volatile memory when a quantity of the received data stored in the volatile memory reaches a threshold.

17. A method comprising:
storing, in a memory device, data received from a vehicle;
performing computations, by a processing device in the memory device, using at least a portion of the stored data to generate at least one instruction for the vehicle; and
writing the instruction to a first cache of the memory device, wherein a processor of the vehicle is configured to control at least one function of the vehicle based on reading the instruction from a second cache of the vehicle that is maintained in coherency with the first cache.

18. The method of claim 17, further comprising storing the instruction for reading by the processor of the vehicle.

19. The method of claim 17, further comprising maintaining a coherent memory space between the processor of the vehicle and a memory of the memory device.

20. The method of claim 19, wherein the memory stores historical data associated with prior operation of the vehicle, the method further comprising training a neural network using the historical data.

21. The method of claim 17, further comprising generating the instruction as an output from a neural network having a portion of the stored data as an input.

22. The memory device of claim 1, wherein the memory is configured to store data received from the vehicle.

23. The memory device of claim 1, wherein the processor is configured to control at least one function of the vehicle based on the instruction.

* * * * *